United States Patent
Liu et al.

(10) Patent No.: US 8,950,683 B2
(45) Date of Patent: Feb. 10, 2015

(54) PRODUCTION PROCESS OF TAG ANTENNA

(71) Applicants: Zhijia Liu, Shanghai (CN); Guohong Du, Sichuan (CN)

(72) Inventors: Zhijia Liu, Shanghai (CN); Guohong Du, Sichuan (CN)

(73) Assignee: Zhijia Liu, Shanghai (CN)

( * ) Notice: Subject to any disclaimer, the term of this patent is extended or adjusted under 35 U.S.C. 154(b) by 0 days.

(21) Appl. No.: 14/299,754

(22) Filed: Jun. 9, 2014

(65) Prior Publication Data

US 2014/0284388 A1  Sep. 25, 2014

Related U.S. Application Data

(63) Continuation of application No. 14/286,364, filed on May 23, 2014, now abandoned, which is a continuation-in-part of application No. PCT/CN2012/085173, filed on Nov. 23, 2012, and a continuation-in-part of application No. PCT/CN2013/073998, filed on Apr. 10, 2013.

(30) Foreign Application Priority Data

Nov. 25, 2011 (CN) .......................... 2011 1 0382882
Apr. 10, 2012 (CN) .......................... 2012 1 0103709

(51) Int. Cl.
*G06K 19/06* (2006.01)

(52) U.S. Cl.
USPC ................... 235/492; 235/380; 343/700 MS

(58) Field of Classification Search
USPC ........... 343/700 MS; 235/375, 380, 486, 495, 235/492
See application file for complete search history.

(56) References Cited

U.S. PATENT DOCUMENTS

| | | | |
|---|---|---|---|
| 7,434,739 B2 | 10/2008 | Matsuura et al. | |
| 7,589,675 B2 | 9/2009 | Chang et al. | |
| 8,678,295 B2 | 3/2014 | Liu | |
| 2004/0100407 A1* | 5/2004 | Okado | 343/700 MS |
| 2009/0140927 A1 | 6/2009 | Maeda et al. | |

FOREIGN PATENT DOCUMENTS

| | | |
|---|---|---|
| CN | 101017534 A | 8/2007 |
| CN | 201984510 U | 9/2011 |
| CN | 102254213 A | 11/2011 |
| CN | 202352834 U | 7/2012 |
| JP | 06-085530 A | 3/1994 |
| JP | 2008-172697 A | 7/2008 |
| WO | 2012-036139 A1 | 3/2012 |

\* cited by examiner

*Primary Examiner* — Karl D Frech
(74) *Attorney, Agent, or Firm* — McDonnell Boehnen Hulbert & Berghoff LLP

(57) ABSTRACT

A production process of a tag antenna and a micro strip patch RFID tag antenna. The production process includes: an etching step of etching a metal layer on a thin film material composited with the metal layer to form a thin film (1) with radiation unit patterns (11, 12), short circuit pin patterns (13, 14) and ground plate patterns (15, 16); a compositing step of coating gel on the thin film (1) or a substrate (2) and adhering the thin film (1) to the substrate (2); and a folding step of folding the thin film (1) along an edge of the substrate (2), adhering the short circuit pin patterns (13,14) of the thin film (1) to sides of the substrate (2), folding again the thin film (1) in a same direction, adhering the ground plate patterns (15, 16) to a lower surface of the substrate (2).

19 Claims, 3 Drawing Sheets

PRODUCTION PROCESS OF TAG ANTENNA

CROSS-REFERENCE TO RELATED APPLICATIONS

This application is a continuation of co-pending patent application Ser. No. 14/286,364 filed on May 23, 2014, which is turn is a Continuation-In-Part of each of International Application No. PCT/CN2013/073998, filed on Apr. 10, 2013, which is based upon and claims priority to Chinese Patent Application No. 201210103709.5, filed on Apr. 10, 2012; and of International Application No. PCT/CN2012/085173, filed on Nov. 23, 2012, which is based upon and claims priority to Chinese Patent Application No. 201110382882.9, filed on Nov. 25, 2011, the entire contents of each of which are incorporated herein by reference.

TECHNICAL FIELD

The present disclosure relates to a production process of a tag antenna, and more particularly, to a production process of a micro strip tag antenna.

BACKGROUND

An RFID tag antenna is the most changeable part in an RFID system, and its design is faced with actual requirements of miniaturization, conformation, low cost and low loss, thus the optimal design of the RFID tag antenna is important in the whole RFID system.

At present, bandwidths of RFID tag antennas used by various systems are inconsistent with each other in the high-frequency ranges thereof. For example, a band of 866~868 MHz is employed in the European, and a band of 902~928 MHz is employed in the United States. When the RFID tag antenna is switched between the different bandwidths in different regions, the conventional RFID tag antenna is very difficult to be identified in the regions having different bandwidths due to bandwidth limitations. Moreover, when a dielectric thickness is less than 1 mm or a resonant frequency is lower than 910 MHz, a reading distance of the conventional RFID tag antenna is significantly poor. In order to achieve a good identification effect, it is necessary to increase the thickness, the length and the width of the conventional RFID tag antenna, which results that an outline dimension of the RFID tag antenna is increased and costs are increased accordingly.

Referring to FIG. 1, in the related art, many anti-metal tag antennas 10 of a high frequency have a micro strip antenna structure. In order to realize miniaturization, a radiation plate 3 and a ground plate 4 of the micro strip antenna are respectively disposed on a upper surface and a lower surface of a substrate 2, and thus a short-circuit pin 5 is needed to be provided between the radiation plate 3 and the ground plate 4. According to the conventional art, the short-circuit pin 5 between the radiation plate 3 and the ground plate 4 is implemented by printing or forming a via hole in general. For example, silver paste is printed on a ceramic surface; the via hole is formed on a PCB and then copper is deposited in or gold is plated in the via hole to connect the radiation plate 3 and the ground plate 4, and so on.

Since the above process for forming the short-circuit pin cannot be performed at the same time with the previous formation of the ceramic material or the PCB, the short circuit pin 5 has to be formed in a subsequent process. It causes problems such as decreasing productivity and rising cost. For example, the ceramic surface printing is often performed manually, but the labor cost is high and it is limited to the ceramic surface. Although the process of forming the via hole on the PCB is mature and suitable for mass production, it is not suitable for non-PCB materials due to large limitation of the PCB materials; additionally, the performance of the via hole short circuit is slightly less than that of the micro strip line short circuit.

In view of the above, there is a need in the art for a production process of a tag antenna with simplified process and reduced cost, and a novel small-sized RFID tag antenna, which has compatible functions and is remotely identifiable, becomes the direction of product development in the industry.

SUMMARY

The object of the present disclosure is to provide a production process of a tag antenna, which has simple technology and a low production cost.

According to an embodiment of the disclosure, a production process of a tag antenna is provided. The tag antenna include a substrate, a radiation plate, a ground plate and a short circuit pin, wherein the radiation plate and the ground plate are respectively disposed on an upper surface and a lower surface of substrate; the short circuit pin is disposed on two sides of the substrate to connect the radiation plate and the ground plate. The production process includes an etching step, a compositing step and a folding step. The etching step includes: etching a metal layer provided on a thin film material composited with the metal layer, to form a thin film having radiation unit patterns, short circuit pin patterns and ground plate patterns. The compositing step includes: coating gel on the thin film or the substrate; and adhering the thin film to the substrate. The folding step includes: folding the thin film along an edge of the substrate; adhering the short circuit pin patterns of the thin film to both sides of the substrate; folding the thin film in a same direction; and adhering the ground plate patterns to a lower surface of the substrate. The radiation unit patterns are disposed on the upper surface of the substrate to form the radiation plate of the tag antenna; the ground plate patterns are disposed on the lower surface of the substrate to form the ground plate of the tag antenna; the short circuit pin patterns are disposed on the two sides of the substrate to connect the radiation plate and the ground plate and form the short circuit pin of the tag antenna.

According to anther embodiment of the disclosure, a production process of a tag antenna is provided. The production process includes: an etching step, a compositing step and a folding step. The etching step includes: etching a metal layer provided on a thin film material composited with the metal layer, to form a thin film having radiation unit patterns, short circuit pin patterns and ground plate patterns. The compositing step includes coating gel on the thin film or a thin substrate; aligning the thin film with one end of the thin substrate; and adhering the thin film to the substrate. The folding step includes: folding the thin substrate toward a backside, to which the thin film is not adhered, of the thin substrate along a folding line which is a central line of the short circuit pin patterns, to form the substrate with a double folded structure. The radiation unit patterns are disposed on the upper surface of the substrate to form the radiation plate of the tag antenna; the ground plate patterns are disposed on the lower surface of the substrate to form the ground plate of the tag antenna; the short circuit pin patterns are disposed on the two sides of the substrate to connect the radiation plate and the ground plate and form the short circuit pin of the tag antenna.

The present disclosure is based upon a micro strip patch RFID tag antenna designed with ultra-thin medium with 1 mm or less. The object of the present disclosure is to provide a micro strip patch RFID tag antenna, which is designed with respect to a micro strip patch RFID tag antenna operated on a metal surface and a non-metal surface, and has excellent performance when applied to the metal surface. The micro strip patch RFID tag antenna of the present disclosure has advantages such as miniaturization, low loss and remote identification.

According to another embodiment of the disclosure, a micro strip patch RFID tag antenna is provided. The micro strip patch RFID tag antenna includes a radiation plate having a chip thereon, a substrate and a ground plate. The radiation plate is configured to comprise a first radiation unit and a second radiation unit; the chip is configured to be disposed between the first radiation unit and the second radiation unit; the first radiation unit is configured to be provided with a first slot thereon; the second radiation unit is configured to be provided with a second slot thereon; and the first slot and the second slot are configured to be symmetrically provided with respect to the chip, so as to decrease a resonant frequency of an RFID tag antenna and an antenna size, and to increase a reading distance of the RFID tag antenna.

The production process of a tag antenna has simply technology and a low production cost. Meanwhile it may be solved that the PET thin film 1 tends to wrinkle in the composition and folding processes due to its soft texture caused from its small thickness. Moreover, it can align the edges of the thin film and the substrate, so as to avoid the obliqueness of the thin film. Additionally, the radiation plate of the RFID tag antenna of the present disclosure is provided with the slot structures, and thus the slots are coupled to each other to decrease a resonant frequency of the RFID tag antenna. Compared with a conventional RFID tag antenna without the slot, a size of the RFID tag antenna of the present disclosure is significantly reduced, and the resonant frequency the RFID tag antenna of the present disclosure is significantly lower. Therefore, a relative bandwidth of the micro strip patch RFID tag antenna, of which relative bandwidth is lower than 2%-5% in theory, can be increased to more than 10% (as shown in Table 1), so that the RFID tag of the present disclosure can be used within wider bandwidth while guaranteeing small size, so as to meet different requirements for RFID of UHF bandwidth in various countries.

DETAILED DESCRIPTION

Hereinafter, the production process of a tag antenna according to the present disclosure is described. In order to avoid redundancy, the same reference number will be given to the functional component of the following embodiments that are the same with that in the related art, and the same functional component of different embodiment is indicated by the same reference number.

Figure 3:
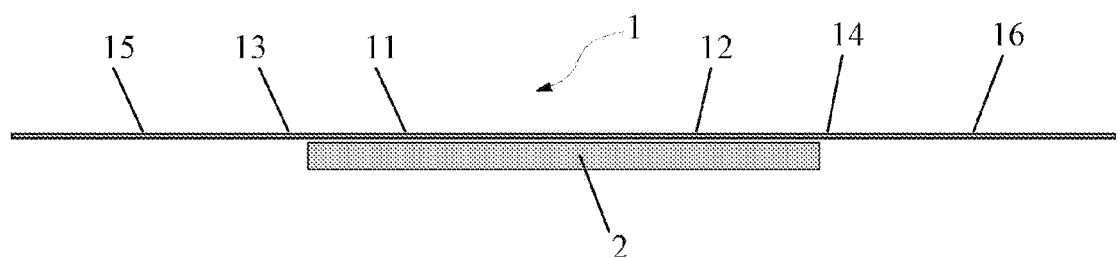
FIG. 3 is a schematic view showing a composition step according to a first embodiment of the present disclosure.
Figure 4:
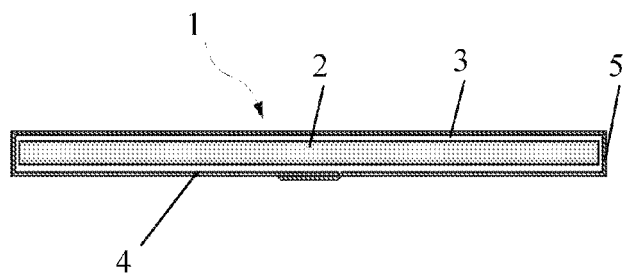
FIG. 4 is a schematic view showing a structural of a tag antenna formed according to the first embodiment of the present disclosure.

A production process of a tag antenna 10 will be described with reference with FIGS. 2 to 4.

The tag antenna 10 according to the present disclosure has a substrate 2, a radiation plate 3, a ground plate 4 and short circuit pins 5. Specifically, the radiation plate 3 and the ground plate 4 are disposed on an upper surface and a lower surface of the substrate 2, respectively. The short circuit pins 5 are disposed on surfaces of both sides of the substrate 2, to connect the radiation plate 3 and the ground plate 4.

Figure 1:
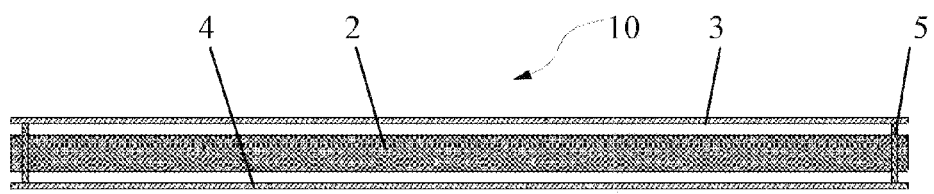
FIG. 1 is a schematic view showing a structure of a conventional tag antenna.
Figure 2:
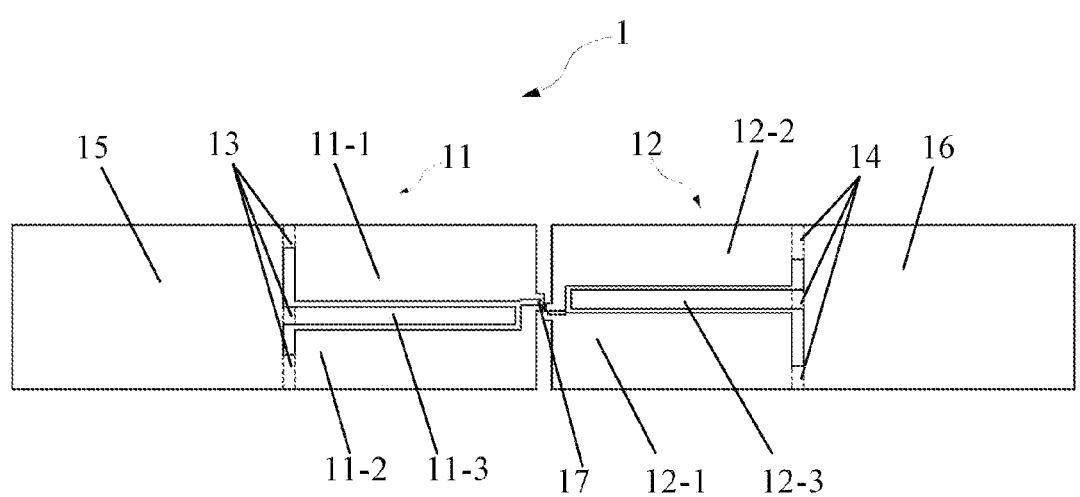
FIG. 2 is a schematic plane view showing a thin film formed by an etching step according to the present disclosure.
Figure 8:
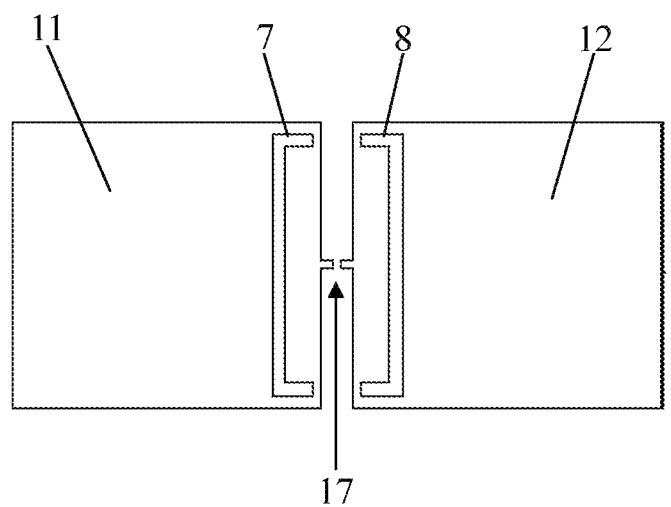
FIG. 8 is a plan view showing a radiation plate of an RFID tag antenna of the present disclosure.

As shown in FIG. 2, the tag antenna 10 according to the present disclosure is formed by an etching process in which a metal layer on a PET thin film material composited with the metal layer is etched, while a PET thin film 1 having radiation unit patterns 11, 12, short circuit pin patterns 13, 14 and ground plate patterns 15, 16 are formed. A chip is fixed on the radiation plate 3 by welding, and the radiation unit patterns 11, 12 are connected via the chip 17; the substrate 2 is provided with a slot or a via hole thereon, and a depth of the slot or the via hole is larger than a height of the chip (17), as shown in FIGS. 2 and 8. The substrate may be formed by flexible and non-conduct materials, such as Polypropylene (PP) materials, Expandable Polyethylene (EPE) materials or foaming materials. Specifically, the ground plate patterns 15, 16 are disposed at both ends of the PET thin film 1. The radiation unit patterns 11, 12 are formed at the middle of the PET thin film 1. The radiation unit pattern 11 has a first radiation element 11-1, a second radiation element 11-2 and an isolation unit 11-3 which is disposed between the first radiation element 11-1 and the second radiation element 11-2 and isolates the first radiation element 11-1 from the second radiation element 11-2. The radiation unit pattern 12 has a third radiation element 12-1, a fourth radiation element 12-2 and an isolation unit 12-3 which is disposed between the third radiation element 12-1 and the fourth radiation element 12-2 and isolates the third radiation element 12-1 from the fourth radiation element 12-2. The radiation unit pattern 11 is coupled with the radiation unit pattern 12 through a chip 17. The short circuit pin patterns 13 is disposed between the radiation unit patterns 11 and the ground plate patterns 15; the short circuit pin patterns 14 is disposed between the radiation unit patterns 12 and the ground plate patterns 16. The first radiation element 11-1, the second radiation element 11-2 and the isolation unit 11-3 of the radiation unit pattern 11 are connected to the ground plate pattern 15 through the short circuit pin pattern 13; and the third radiation element 12-1, the fourth radiation element 12-2 and the isolation unit 12-3 are connected to the ground plate pattern 16 through the short circuit pin pattern 14. The left and right boundary lines of the short circuit pin patterns 13, 14 (as shown by dotted lines in FIG. 2) are served as folding lines for folding the PET thin film 1 in the subsequent process. The total length of the radiation unit patterns 11, 12 formed by the etching process is the same as the length of the substrate 2. The lengths of the short circuit pin patterns 13, 14 are the same as the thickness of the substrate 2. The length of the ground plate patterns 15, 16 are between the length of the substrate to half of it, so that the ground plate patterns 15, 16 may overlap with the lower surface of the substrate 2. The lengths of the ground plate patterns 15, 16 determine the length of an area in which the PET thin film 1 is overlapped on the lower surface of the substrate.

Then, gel is coated on the PET thin film 1 or the substrate 2. Subsequently, the PET thin film 1 is adhered to the upper surface of the substrate 2. As shown in FIG. 3, in the adhering process, the radiation unit patterns 11, 12 are overlapped with the upper surface of the substrate 2; meanwhile, one folding line of each of the short circuit pin patterns 13, 14 is exactly disposed at an edge of the surface of the substrate 2. Then the PET thin film 1 is folded along sides of the substrate 2 to adhere the short circuit pin patterns 13, 14 of the PET thin film 1 to the sides of the substrate 2. The PET thin film 1 is folded again along the same direction by another folding line of each of the short circuit pin patterns 13, 14, so as to adhere the ground plate patterns 15, 16 to the other side, i.e. the lower surface of the substrate 2, and to make them overlap each other on the lower surface of the substrate 2. The length of the overlapping area is determined by the lengths of the ground plate patterns 15, 16. Although the length may allow the overlapping area to cover the entire lower surface of the substrate 2, it may be 1-5 mm in consideration of the reduced cost by saving the amount of the PET thin film 1. In this way, the ground plate 4 is formed. The radiation unit patterns 11, 12 are disposed on the upper surface of the substrate 2 to form the radiation plate 3 of the tag antenna 10. The short circuit pin patterns 13, 14 are disposed at the both sides of the substrate 2 and connect the radiation plate 3 and the ground plate 4, so as to form the short circuit pin 5 of the tag antenna 10. In this way, the tag antenna 10 with a whole structure is formed.

The above exemplary embodiment intends to illustrate the production process according to the present disclosure, not to limit the structure of the present disclosure. The radiation unit pattern according to the present disclosure is not limited to two pairs of radiation elements and may be radiation unit patterns of any other forms which are capable of implementing the function of the radiation plate of the tag antenna. It is not necessary that the lengths of the short circuit pin patterns 13, 14 of the PET thin film 1 according to the present disclosure are the same as the thickness of the substrate 2; and the lengths may be adjusted by the person skilled in the art according to the factors such as errors in production, the performance of the PET thin film 1, the performance of the substrate 2, and the variance of the production process.

The advantages of the embodiment is as follows: in the production of the tag antenna, the radiation unit patterns 11, 12, the short circuit pin patterns 13, 14 and the ground plate patterns 15, 16 may be directly formed on the PET thin film 1 through the etching process. By adopting the composition process and folding process, the process for individually form the short circuit pin 5 in the production of the tag antenna is simplified; the process according to the disclosure is simpler, and may effectively reduce the production cost of the tag antenna.

Figure 5:
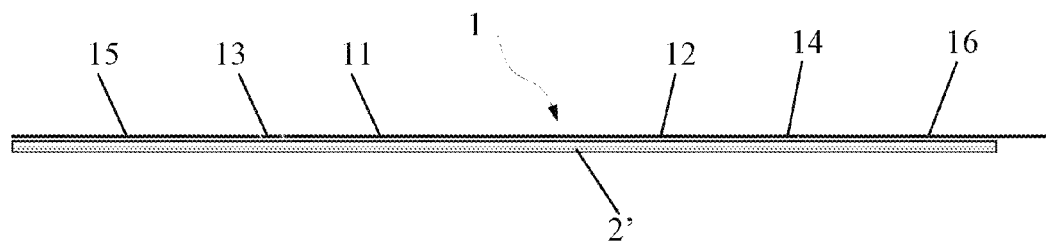
FIG. 5 is a schematic view showing the composition step according to a second embodiment of the present disclosure.
Figure 6:
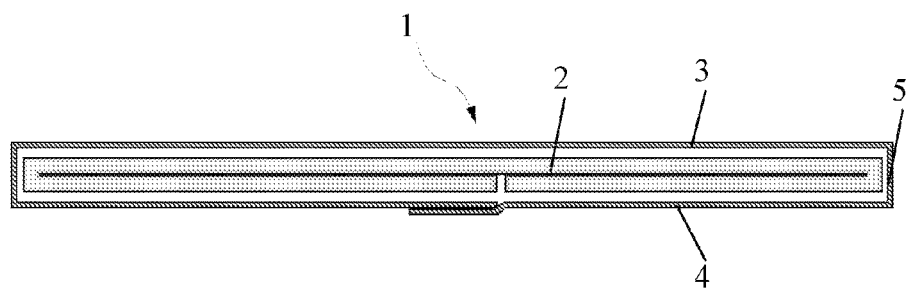
FIG. 6 is a schematic view showing a structural of a tag antenna formed according to the second embodiment of the present disclosure.

Hereinafter, another production process of a tag antenna according to the present disclosure is described with reference to FIGS. 5 and 6. Specifically, a production process of the PET thin film 1 is the same as that in the above embodiment, and both of them adopt the same PET thin film 1. The difference is as follows: a thin substrate 2' is utilized in the production of the tag antenna 10 according to this embodiment; the thickness of the thin substrate 2' is ½ of the substrate 2 of the tag antenna 10; the length of the thin substrate 2' is nearly 2 times of the length of the substrate 2 of the standard tag antenna 10, the term "nearly" as used here means that the length of the thin substrate 2' is 1-5 nm less than the 2 times of the length of the substrate 2. For example, in order to produce a tag antenna with the size of 50 mm*25 mm*0.5 mm (length*width*thickness), the thin substrate 2' according to this embodiment may have the size of (95-99) mm*25 mm*0.25 mm (length*width*thickness).

In the production process, gel is coated on the PET thin film 1 or the thin substrate 2'. One end of the PET thin film 1 is aligned with an edge of the thin substrate 2' according to this embodiment to adhere the PET thin film 1 to the thin substrate 2'. The thin substrate 2' with the PET thin film 1 is folded toward its backside without the PET thin film 1 for 180 degree along folding lines which are respectively the central lines of the short circuit pin patterns 13, 14, such that the thin substrate 2' with a thickness, which is half of the thickness of the substrate 2 of the tag antenna, forms a substrate 2 with a double folded structure, so as to have the same thickness with the substrate 2 of the tag antenna. The radiation unit patterns 11, 12 of the PET thin film 1 form the radiation plate 3 on the surface of the substrate 2'. The two ends of the thin substrate 2' are close to each other rather than overlapped each other on the lower surface of the thin substrate 2', and there is a minor gap which may be 1-5 mm between the two ends, thereby forming the substrate 2 of the tag antenna. The ground plate patterns 15, 16 at the both ends of the PET thin film 1 are overlapped each other at one side. The length of the overlapping area is determined by the length of the ground plate patterns 15, 16. Although the length may allow the overlapping area to cover the entire lower surface of the substrate 2, it may be 1-5 mm in consideration of the reduced cost by saving the amount of the PET thin film 1. In this way, the ground plate 4 is formed. The short circuit pin patterns 13, 14 of the PET thin film 1 respectively form the short circuit pins 5 at the folded position of the thin substrate 2' to connect the radiation plate 3 and the ground plate 4.

In this embodiment, by folding the thin substrate 2' to form the substrate 2 of the tag antenna 10, so that it may be reduced that the PET thin film 1 tends to wrinkle in the composition and folding processes due to its soft texture caused from its small thickness. Moreover, the length of the thin substrate 2' is nearly 2 times of the substrate 2 in the embodiment, therefore, in the composition process of the thin substrate 2' and the PET thin film 1, the edges of the thin substrate 2' and the PET thin film 1 are more easily aligned, so as to avoid the deviation between the substrate 2 and the PET thin film 1. Since the substrate folding process is adopted to form the substrate 2 of the tag antenna in this embodiment, the operability and production efficiency of the production device is maximally utilized.

The length of the thin substrate 2' according to the embodiment of the present disclosure is about 1-5 mm less than the length 2 times of the length of the substrate 2; in this way, the thin substrate 2' may be prevented from overlapping due to the length in the subsequent process which may makes the surface of the substrate 2 uneven. However, the protection scope of the present disclosure is not limited to this value, and it may be adjusted as desired by those skilled in the art on the basis of the present disclosure.

Meanwhile, the thickness of the substrate 2' according to the embodiment of the present disclosure is designed as ½ of the thickness of the substrate 2. However, the thickness of the substrate 2' is not limited to it. The substrate 2' may have thickness distributed by section. That is, a portion, where the thin substrate 2' is composited with the radiation unit patterns 11, 12, has a first thickness, which is, for example, ⅓ of the thickness of the substrate 2 or else; and a portion where the thin substrate 2' is composited with ground plate patterns 15, 16 has a second thickness, which is, for example, ⅔ of the thickness of the substrate 2 or else; as long as the thickness of the substrate of the final product is the same as that of the substrate 2 with a double folded structure which is formed by respectively folding portions with the first and second thickness.

It should be noted that the PET thin film described in the above embodiment of the present disclosure is a certain form, however, the thin film according to the present disclosure is limited thereto, and may be other types of thin film or thin film formed of other materials which may have an equivalent effect with the thin film according to the present disclosure. In the above embodiment, the metal thin film formed on the thin film may be a copper film, an aluminum film, a silver film and other material which may form a thin film with electricity conductivity. The forms of the composition between the metal thin film and the PET thin film may be well known composition forms in the art such as adhering, sputtering, plating, etc., by adhering. In the above embodiment, the PET thin film 1 formed by the etching step may be a signal plate form of product shown in FIG. 2; and also may be consecutive units formed on the strip of the PET thin film, which may be cut by such as a laser cutter controlled by a computer in the subsequent steps of composition and pasting for forming the tag antenna, so as to form the final product shown in FIG. 2.

Figure 7:
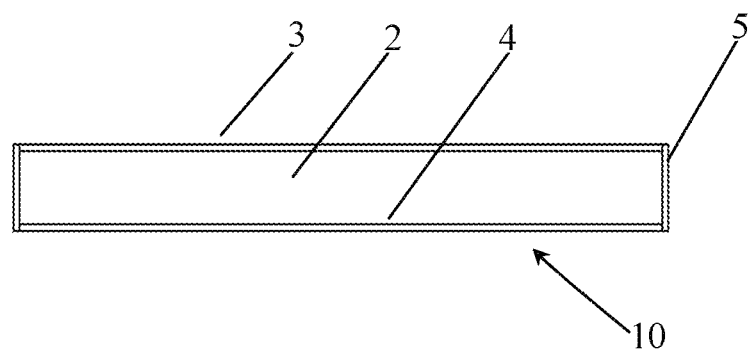
FIG. 7 is a diagram showing a structure of an RFID tag antenna of the present disclosure.

As shown in FIGS. 2, 7 and 8, a wideband/ultra-wideband micro strip patch RFID tag antenna 10 of the preset disclosure includes a substrate 2, a radiation plate 3 attached to an upper surface of the substrate 2 and a ground plate 4 attached to a lower surface of the substrate 2. Short-circuit pins 5 are provided on both sides of the substrate 2.

In a certain embodiment of the present disclosure, the radiation plate 3 of the present disclosure includes a first radiation unit 11 and a second radiation unit 12. A first slot 7 is provided on the first radiation unit 11, and a second slot 8 is provided on the second radiation unit 12. Shape of each of the first slot 7 and the second slot 8 is U-shape. The first and second slots are formed as the U-shape, symmetrically arranged of two sides of a chip 17 of the RFID tag antenna 10, and openings of thereof are faced each other.

By providing the slots on the radiation plate of the RFID tag antenna 10, the resonant frequency of the RFID tag antenna 10 and the antenna size are efficiently decreased, and the bandwidth of the RFID tag antenna 10 is increased.

Hereinafter, detailed description will be made in combination with data in Table 1.

TABLE 1

| Two Cases | Resonant Frequency f (MHz) | −10 dB Bandwidth (MHz) | Relative Bandwidth | Gain G (dB) |
|---|---|---|---|---|
| without U-shaped slot | 997 | 32.1 | 3.2% | −4.37 |
| with U-shaped slot | 897.5 | 94.4 | 10.5% | −7.0029 |

The data in Table 1 shows comparison of related parameters between the radiation plate 3 without the slot structure and the radiation plate 3 with the slot structure, in a case where sizes of radiation units of the RFID tag antenna are the same (which are both placed on the metal back-plates of 150 mm*150 mm).

It should be explained for the comparison of the gains that the comparison of the gains, i.e., the gain G of the RFID tag antenna 10, in which the radiation plate 3 is provided with the slot structure of the present disclosure, is smaller than a gain of an RFID tag antenna without the slot structure, is decided by structural characteristics of the RFID tag antennas, that is, if the resonant frequency of the RFID tag antenna becomes higher, its corresponding gain G is higher accordingly. In Table 1, the resonant frequency of the RFID tag antenna without the slot structure is higher; the resonant frequency decreases after the slot structure is provided on the radiation plate 3, and the corresponding gain G decreases accordingly. However, in a case where the resonant frequency is constant, the performance of the RFID tag antenna in which the radiation plate 3 is provided with the slot structure of the present disclosure is significantly better than that of the RFID tag antenna without the slot structure.

The relationship between the radiation frequency and the wavelength in the art is shown in formula (1):

$$\lambda = \frac{C}{f\sqrt{\varepsilon_r}},\qquad \text{formula (1)}$$

In formula (1), C is a velocity of light, $\varepsilon_r$ is a relative dielectric constant, f is a resonant frequency, and λ is a wavelength. As can be seen from formula (1), the frequency f is inversely proportional to the wavelength λ, and both of the two parameters are related with a size of a radiation unit of an RFID tag antenna; according to a design principle of the RFID tag antenna, the size of the RFID tag antenna needs to be ¼ wavelength or ½ wavelength, therefore the wavelength λ becomes larger as the frequency f decreases, and thus the size of the designed RFID tag antenna increases accordingly. In Table 1, the resonant frequency of the conventional RFID tag antenna without the U-shaped slot is 997 MHz, and the resonant frequency of the RFID tag antenna 10 of the present disclosure may be decreased to 897.5 MHz. Therefore, in a case where the sizes of the radiation units of the RFID tag antennas are the same, the RFID tag antenna 10 of the present disclosure has lower resonant frequency. If the resonant frequency of the RFID tag antenna without the U-shaped slot is reduced to 897.5 MHz, it can be known according to the formula (1) that the size of the RFID tag antenna will be increased and will be larger than the size of the RFID tag antenna 10 of the present disclosure. For the same reason, in a case where the resonant frequencies are the same, compared to the size of the RFID tag antenna without the U-shaped slot, the size of the micro strip patch RFID tag antenna 10 with the slot structures 7 and 8 of the present disclosure is smaller.

According to the data in Table 1, compared to the gain G of the RFID tag antenna without the slot structure, the gain G of the RFID tag antenna 10 of the present disclosure is lower, it is because that the resonant frequency f is lower, that is, the gain of the RFID tag antenna 10 increases as the resonant frequency increases. In a case where the frequencies are the same, the RFID tag antenna 10 with the slot structure has a better gain than that of the conventional RFID tag antenna.

Different countries may adopt different RFID frequencies, for example, a frequency standard of an RFID tag antenna in the European is 866-868 MHz, and a frequency standard of an RFID tag antenna in the United States is 902-928 MHz. In a case where sizes of radiation units are the same, reflection coefficients of various RFID tag antennas are different. In order to illustrate a comparison between a reflection coefficient of a chip port of the RFID tag antenna with the slot structures 7 and 8 according to the present disclosure and that of the RFID tag antenna without the slot structure, −10 db bandwidth commonly used in the art is taken as a comparison standard of reflection coefficients. As shown in Table 1, the bandwidth of the RFID tag antenna, in which the radiation plate 3 is not provided with the slot structure, is only 32.1 MHz, it is hard to meet frequency requirements in the above two regions; on the contrary, the bandwidth of the RFID tag antenna 10 in which the radiation plate 3 is provided with the slot structure rises up to 94.4 MHz which is wider than the bandwidth of the conventional RFID tag antenna, and may well meet the requirements of 866-868 MHz in Europe, 902-928 MHz in United States, and 952-954 MHz in Japan.

The above describes exemplary embodiments of the present disclosure; however, specific structures of the present disclosure are not limited thereto, the first slot 7 and the second slot 8 of the present disclosure may have a 1-shape, a U-shape or an M-shape.

The first slot 7 and the second slot 8 of the present disclosure may be provided at any locations, which are symmetric with a location of the chip 17, on the first radiation unit 11 and the second radiation unit 12. There are two slots in the embodiments of the present disclosure, and those skilled in the art may dispose several slot structures at symmetric locations with respect to the chip 17 of the RFID tag antenna.

Based on the above-described improvements, the present disclosure solves the problem of long-distance reading/writing of some RFID tag antennas at present, such that the reading distance of the RFID tag antennas is increased, therefore the RFID tag antennas can be applied to actual application environments having requirements of long-distance reading/writing. The present disclosure is designed based on an ultra-thin medium with 1 mm or less, its performance is outstanding compared to other features, and bandwidth of the RFID tag antenna is increased, such that the RFID tag antenna of the present disclosure may be used in wider bandwidth.

The above description is only an explanation and illustration to the specific embodiment of the present disclosure, and the features of the present disclosure are not limited thereto, but are define as followings. All the embodiments that are in compliance with the spirit of the protection scope of the claims of the present disclosure and the embodiments with similar alteration, are all belong to the scope of the present disclosure. It is obvious for those skilled in the art to alter and modify the present disclosure, which all fall in the protection scope of the claims of the present disclosure.

What is claimed is:

1. A production process of a tag antenna comprising a substrate (2), a radiation plate (3), a ground plate (4) and a short circuit pin (5), wherein the radiation plate (3) and the ground plate (4) are respectively disposed on an upper surface and a lower surface of substrate (2), the short circuit pin (5) is disposed on two sides of the substrate (2) to connect the radiation plate (3) and the ground plate (4), the production process comprises:
   an etching step comprising:
      etching a metal layer provided on a thin film material composited with the metal layer, to form a thin film (1) having radiation unit patterns (11, 12), short circuit pin patterns (13, 14) and ground plate patterns (15, 16);
   a compositing step comprising:
      coating gel on the thin film (1) or the substrate (2); and
      adhering the thin film (1) to the substrate (2);
   a folding step comprising:
      folding the thin film (1) along an edge of the substrate (2),
      adhering the short circuit pin patterns (13,14) of the thin film (1) to both sides of the substrate (2),
      folding the thin film (1) in a same direction; and
      adhering the ground plate patterns (15, 16) to a lower surface of the substrate (2);
   wherein, the radiation unit patterns (11, 12) are disposed on the upper surface of the substrate (2) to form the radiation plate (3) of the tag antenna (10); the ground plate patterns (15, 16) are disposed on the lower surface of the substrate (2) to form the ground plate (4) of the tag antenna (10); the short circuit pin patterns (13, 14) are disposed on the two sides of the substrate (2) to connect the radiation plate (3) and the ground plate (4) and form the short circuit pin (5) of the tag antenna (10).

2. The production process according to claim 1, wherein a total length of the radiation unit patterns (11, 12) formed in the etching step is same as the length of the substrate (2).

3. The production process according to claim 1, wherein the thin film material is a PET thin film material.

4. The production process according to claim 1, wherein the tag antenna (10) further comprises a chip (17), and the production process further comprises:
   fixedly welding the chip (17) on the radiation plate (3), so that the radiation unit patterns (11, 12) are connected via the chip (17); and
   providing a slot or a via hole on the substrate (2), wherein a depth of the slot or the via hole is larger than a height of the chip (17).

5. The production process according to claim 1, wherein the substrate (2) is formed by flexible and non-conduct materials.

6. The production process according to claim 1, wherein the substrate (2) is formed by Polypropylene (PP) materials, Expandable Polyethylene (EPE) materials or foaming materials.

7. A production process of a tag antenna comprising a substrate (2), a radiation plate (3), a ground plate (4) and a short circuit pin (5), wherein the radiation plate (3) and the ground plate (4) are respectively disposed on an upper surface and a lower surface of substrate (2), the short circuit pin (5) is disposed on two sides of the substrate (2) to connect the radiation plate (3) and the ground plate (4), the production process comprises:
   an etching step comprising:
      etching a metal layer provided on a thin film material composited with the metal layer, to form a thin film (1) having radiation unit patterns (11, 12), short circuit pin patterns (13, 14) and ground plate patterns (15, 16);
   a compositing step comprising:
      coating gel on the thin film (1) or a thin substrate (2'),
      aligning the thin film (1) with one end of the thin substrate (2'), and
      adhering the thin film (1) to the substrate (2);
   a folding step comprising:
      folding the thin substrate (2') toward a backside, to which the thin film (1) is not adhered, of the thin substrate (2') along a folding line which is a central line of the short circuit pin patterns (13, 14), to form the substrate (2) with a double folded structure;
   wherein, the radiation unit patterns (11, 12) are disposed on the upper surface of the substrate (2) to form the radiation plate (3) of the tag antenna (10); the ground plate patterns (15, 16) are disposed on the lower surface of the substrate (2) to form the ground plate (4) of the tag antenna (10); the short circuit pin patterns (13, 14) are disposed on the two sides of the substrate (2) to connect the radiation plate (3) and the ground plate (4) and form the short circuit pin (5) of the tag antenna (10).

8. The production process according to claim 7, wherein, a thickness of the thin substrate (2') is half of that of the substrate (2).

9. The production process according to claim 7, wherein, a length of the thin substrate (2') is 1-5 mm less than a length 2 times of a length of the substrate (2).

10. The production process according to claim 9, wherein, the thin film material is a PET thin film material.

11. The production process according to claim 7, wherein, in the etching step, a total length of the radiation unit patterns (11, 12) is same as the length of the substrate (2).

12. The production process according to claim 7, wherein the tag antenna (10) further comprises a chip (17), and the production process further comprises:
   fixedly welding the chip (17) on the radiation plate (3), so that the radiation unit patterns (11, 12) are connected via the chip (17); and
   providing a slot or a via hole on the substrate (2), wherein a depth of the slot or the via hole is larger than a height of the chip (17).

13. The production process according to claim 12, wherein the substrate (2) is formed by flexible and non-conduct materials.

14. The production process according to claim 7, wherein the substrate (2) is formed by Polypropylene (PP) materials, Expandable Polyethylene (EPE) materials or foaming materials.

15. A micro strip patch RFID tag antenna comprising a radiation plate (3) having a chip (17) thereon, a substrate (4) and a ground plate (4), wherein,
   the radiation plate (3) is configured to comprise a first radiation unit (11) and a second radiation unit (12);
   the chip (17) is configured to be disposed between the first radiation unit (11) and the second radiation unit (12);
   the first radiation unit (11) is configured to be provided with a first slot (7) thereon;
   the second radiation unit (12) is configured to be provided with a second slot (8) thereon; and
   the first slot (7) and the second slot (8) are configured to be symmetrically provided with respect to the chip (17), so as to decrease a resonant frequency of an RFID tag antenna (10) and an antenna size, and to increase a reading distance of the RFID tag antenna;
   wherein, the first slot (7) and the second slot (8) have at least one of a 1-shape, a U-shape and an M-shape.

16. The RFID tag antenna according to claim 15, wherein, the first slot (7) and the second slot (8) have a U-shape.

17. The RFID tag antenna according to claim 15, wherein, the first slot (7) and the second slot (8) are configured to be disposed at any location on the radiation plate (3).

18. The RFID tag antenna according to claim 15, wherein, the first slot (7) and the second slot (8) are configured to be located on symmetrical locations at both sides of the chip (17).

19. The RFID tag antenna according to claim 15, wherein, the first radiation unit (11) and the second radiation unit (12) are respectively provided with a plurality of slot structures which are symmetrically arranged with respect of the chip (17); wherein, short-circuit pins (5) are configured to be provided on both sides of the substrate (2).

* * * * *